United States Patent Office 3,398,547
Patented Aug. 27, 1968

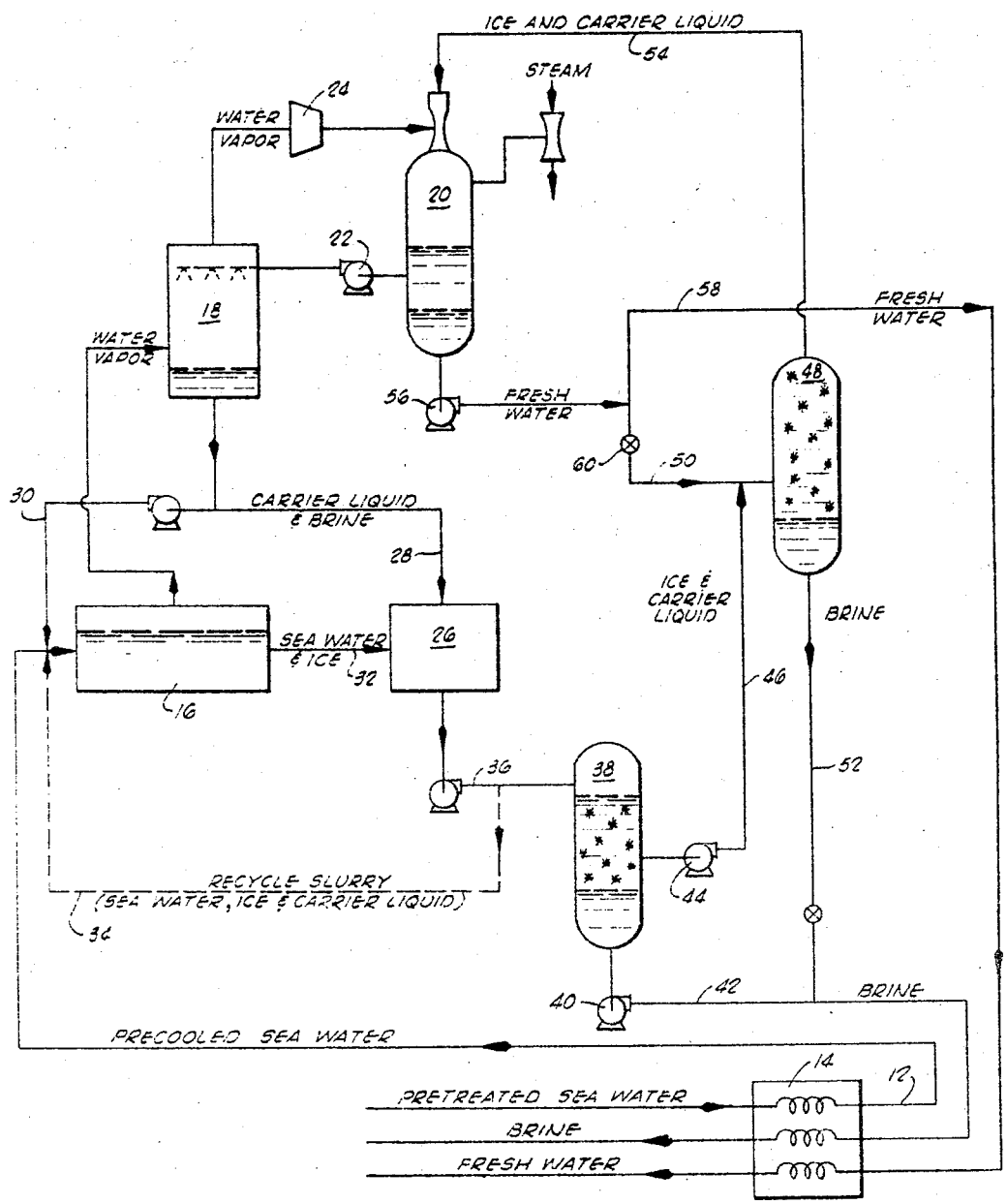

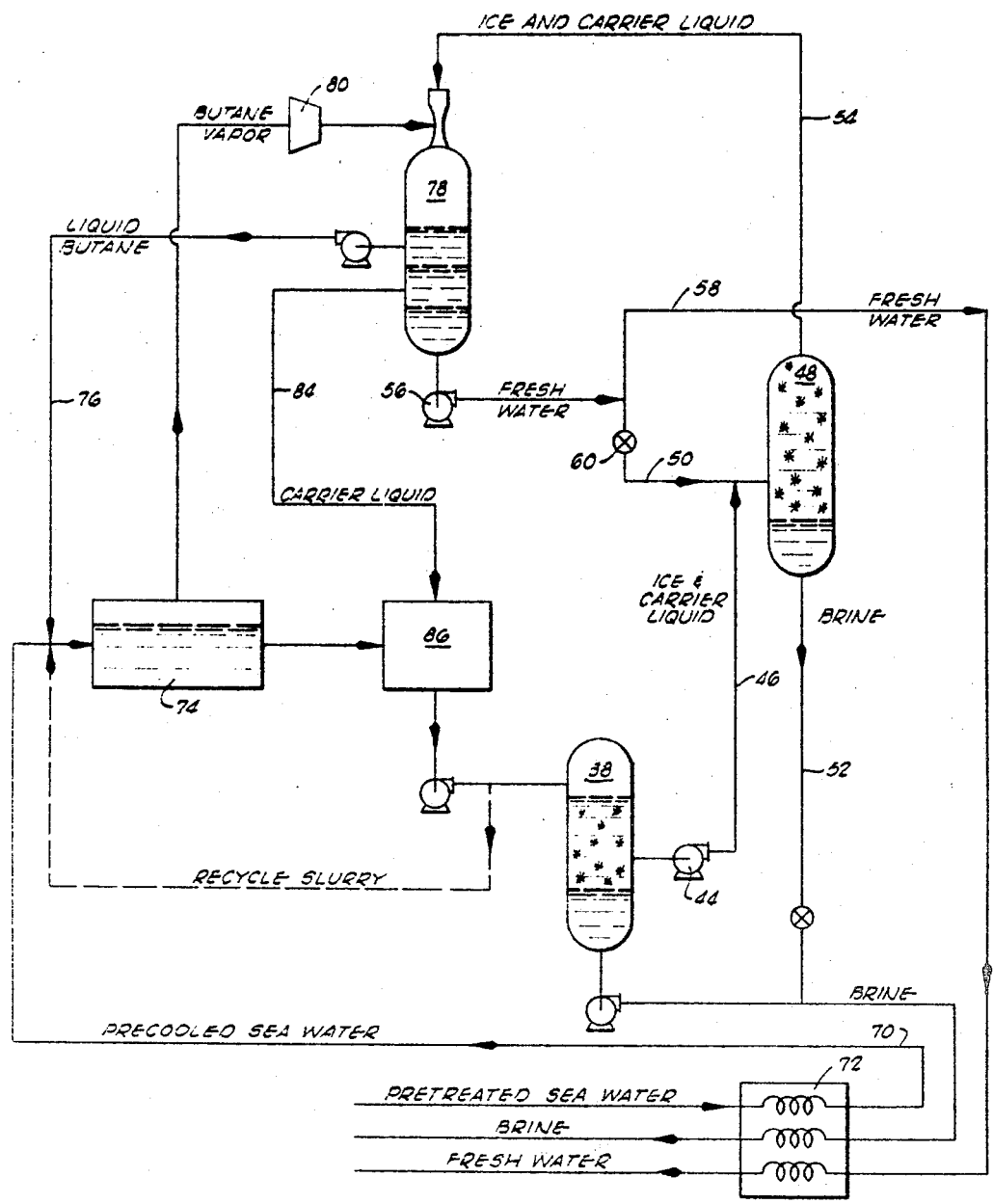

3,398,547
PROCESS FOR RECOVERING RELATIVELY
PURE WATER FROM SALINE SOLUTIONS
Cedomir M. Sliepcevich and Hadi T. Hashemi, Norman, Okla., assignors, by direct and mesne assignments, of thirty-seven and one-half percent to University Engineers, Inc., Norman, Okla., a corporation of Oklahoma, and sixty-two and one-half percent to E-C Corporation, Wilmington, Del., a corporation of Delaware
Filed Nov. 26, 1965, Ser. No. 509,737
19 Claims. (Cl. 62—58)

This invention relates to a process for more economically recovering potable water from saline solutions, such as sea water and brackish water from underground reservoirs, by freezing ice crystals from the saline solution, separating these ice crystals from the saline solution and then, after occluding brine has been removed from the ice crystals, melting the ice crystals to produce fresh water.

One of the most promising procedures for recovering fresh water from sea water and brackish underground waters entails the procedure of freezing ice crystals or particles from the saline solution, then separating and purifying the ice crystals and converting them to fresh water. Various procedures have been proposed for freezing the water, and in general, no great difficulty is encountered in effectively accomplishing this phase of the process. Less easily accomplished, however, is the isolation of the ice crystals in a relatively pure state, so that they can be converted to palatable water. In one process, it has been proposed to use a portion of a relatively volatile refrigerant liquid, identical to that used to freeze the ice crystals, to separate the ice crystals from the sea water and to wash the crystals. The handling of the refrigerant liquid throughout the process, including several changes of state between gaseous and liquid phases, requires a large energy input, however, and reduces the attractiveness of the process. Other methods of separating and purifying the ice also present certain disadvantages which render the freezing method of de-salinization less attractive under some circumstances than other techniques for salt removal.

The present invention provides an improved freezing process for recovering relatively pure water from saline solutions, such as sea water and brackish water. Broadly described, the invention comprises initially freezing ice crystals from the saline solution using a refrigerant which can be either the water present in the solution per se, or a relatively low boiling, organic liquid which is immiscible wth the saline solution. The saline solution and the ice crystals are then mixed with a carrier liquid which is immiscible in the refrigerant material used in the freezing step of the process, such carrier liquid having a freezing point below the freezing point of the saline solution, and being mutually immiscible with water. The carrier liquid is further characterized in having a density less than the density of either the saline solution or of fresh water.

Preferably the density of the carrier liquid is equal to or greater than the effective density of the ice crystals which are formed in the freezing step. The ice and carrier liquids are separated from the saline solution using the difference in the density characteristics of the carrier liquid and the saline solution to effect the separation, and concurrently with such separation, the ice crystals are suspended or slurried in the carrier liquid. With the ice crystals suspended in the carrier liquid, the slurry thus formed is treated to remove occluded brine from the ice crystals and thereby to purify the crystals. The brine which is removed from the surface of the ice crystals is separated from the slurry of ice crystals and carrier liquid so that the ice crystals can then be melted to produce substantially pure water which is mutually immiscible with the carrier liquid. As a final step in the process, the pure water is separated from the carrier liquid, again using the density difference between the carrier liquid and pure water to effect the separation.

The salient aspect of the present invention is the employment of a carrier liquid of certain specific characteristics for the purpose of separating from the bulk of the saline solution the ice crystals which are formed, partially washing the ice crystals while entraining them as a slurry, and ultimately, through the use of the carrier liquid as a transporting instrumentality, moving the ice crystals into a chamber or zone where they can be melted and separated from the carrier liquid as fresh water in a high state of purity. The process has particular applicability to those methods hretofore in use for recovering fresh water from sea water, in which methods the ice crystals are frozen from the sea water either by the use of flash evaporation of water, or by the use of an external secondary refrigerant which is also flashed to the vapor state. It will have been noted that, in addition to the specified essential characteristics and properties of the carrier liquid which is utilized, it is further desirable that the carrier liquid possess a density which is at least as great as the effective density of the ice crystals which are formed in the process. The effective density of the solid particles of ice may vary, depending upon their size and shape, and therefore the density of the carrier liquid can vary over a considerable range. Since the carrier liquid is not used at any point in the process as a refrigerating medium, it need not have certain properties generally required of refrigerants used to freeze the ice crystals from the saline solution and, in fact, it is preferred that the carrier liquid be relatively non-volatile and preferably exist as a liquid at temperatures at least as high as about 75° at atmospheric pressure. Use of a relatively non-volatile carrier liquid which is entirely different in its point of usage in the process, and in its physical characteristics, from the refrigerant liquid which is utilized, permits the process to be operated much more economically than those in which the refrigerant itself is used to separate the ice crystals from the saline solution.

From the foregoing description of the invention, it will have become apparent that it is a major object of the present invention to provide an improved procedure for recovering relatively pure water from saline solutions, such as sea water and brackish waters of the type derived from underground reservoirs.

An additional object of the present invention is to provide a more economic process for freezing ice crystals from saline solutions and then isolating and purifying the ice crystals so that they can be more economically utilized as a source of fresh water.

Another object of the present invention is to provide a more efficient method for removing occluded brine from ice crystals which have been frozen from saline solutions for the purpose of deriving potable water therefrom.

In addition to the foregoing described objects and advantages, additional objects and advantages will become apparent as the following detailed description of the invention is read in conjunction with the accompanying drawings which illustrate the invention.

In the drawings:

FIGURE 1 is a schematic flow diagram illustrating one embodiment of the invention in which water vapor is flashed from the pre-cooled saline solution in order to freeze ice crystals from the saline solution.

FIGURE 2 is a schematic flow diagram of a second embodiment of the invention in which a relatively low boiling organic secondary refrigerant is mixed directly with the saline solution, and is flashed to the vapor state under reduced pressure in order to freeze ice crystals from the saline solution.

In referring hereinafter to the accompanying drawings, which are exemplary but non-limiting embodiments of the present invention, reference will be made to the recovery of relatively pure or potable water from sea water by the use of the present invention. It is to be clearly understood, however, that the process is equally applicable to the recovery of fresh water from other saline solutions, such as the brackish waters found in large deposits in naturally occurring underground reservoirs.

In carrying out the embodiment of the process schematically illustrated in FIGURE 1, sea water which has been conventionally pre-treated to remove certain insoluble impurities, etc., therefrom is introduced to the de-salinization process of the invention by a suitable conduit or pipeline 12. The sea water is directed through an indirect heat exchange device 14 where it is cooled to a temperature of from about 20° C. to about 0° C. by indirect heat exchange with cold brine and fresh or potable water produced in the process as hereinafter described. From the heat exchange device 14, the pre-treated, pre-cooled water is conveyed by the pipelin e12 to a freeze-evaporator unit designated by reference character 16.

In the freeze-evaporator unit 16, the pressure on the pre-cooled sea water is reduced to about 3 mm. or 4 mm. Hg. As a result of this pressure reduction, a portion of the sea water is flashed to the vapor state and abstracts its latent heat of vaporization from the remaining body of sea water in the freeze-evaporator 16. The resulting reduction in temperature in the sea water causes ice crystals to be frozen therefrom. Water vapor developed in the freeze-evaporator 16 is taken overhead and is passed to a brine scrubber unit 18 where any droplets of brine or any particles of solid salt which may be entrained in the water vapor are scrubbed therefrom by contact with countercurrently moving carrier liquid which is delivered to the scrubber unit 18 from a condenser 20 by a suitable pump 22.

As hereinbefore indicated, the carrier liquid used in the process of the invention, and which is introduced to the scrubber unit 18 from the condenser 20 possesses several critical properties. First, the carrier liquid is mutually immiscible in water, and is also selected so that the salt carried in the saline solution is not soluble in the carrier liquid. By immiscibility and insolubility as these terms are here used is meant a solubility of less than 1 weight percent. The carrier liquid also possesses a density characteristic which permits it to be physically segregated at all times from the saline solution during the course of the process, the density of the carrier liquid preferably being less than that of the saline solution and also less than the fresh water produced in the process. A carrier liquid having a density of from about 0.5 to about 1.025 grams/cc. will generally be suitable. Finally, the carrier liquid is characterized in having a freezing point which is lower than that of the saline solution, and preferably is as low as −15° C. or lower so that at the temperatures encountered throughout most of the process (which are usually in the vicinity of the freezing point of the saline solution), the viscosity of the carrier liquid remains relatively low.

It should be noted at this point that another characteristic of the carrier liquid is essential in any embodiment which the process of the present invention may assume. The carrier liquid must be substantially immiscible in the refrigerating medium used to freeze the ice crystals from the saline solution. Since, in the embodiment of the process under discussion (that depicted in FIGURE 1) the water of the saline solution itself functions as the refrigerant material as it is flashed to the vapor state by pressure reduction, the characteristic which must also characterize any carrier liquid of immiscibility with water also assures that the property of immiscibility in the refrigerant liquid is satisfied. As will be hereinafter described, however where an external, secondary refrigerant, such as a relatively volatile organic liquid, is utilized to freeze the ice crystals from the saline solution, the same property of substantial immiscibility in this refrigerant material must characterize any carrier liquid which is utilized in the process. More specifically, solubility of the carrier liquid in the refrigerant is less than 10 weight percent and preferably is less than 5 weight percent.

In addition to the foregoing described essential characteristics of the carrier liquid, several additional properties are also desirably possessed by this material. To prevent losses through volatilization during its use in the process, and also to permit it to function effectively in the scrubber unit 18, it is preferred that the carrier liquid remain in the liquid state at temperatures as high as 75° C.

It is also preferred that the carrier liquid, in addition to having a density which is less than that of both the saline solution and the fresh water produced in the process, further be characterized in having a density which is at least as great as the effective density of the ice which is formed in the process, and which is preferably slightly greater than the ice. In other words the density range of the carrier liquid preferably falls between the density of salt water and that of the ice crystals. The effective density of the ice crystals will vary according to the particle size and geometric configuration of the ice crystals, which are in turn determined, to a large extent, by the method by which the ice crystals are formed. Where the crystals are relatively intricately geometrically configured, similarly to snow, the effective density of the crystals may be quite low. On the other hand, where relatively large, compact crystals are formed, the density will be relatively high. In any event, by selecting a carrier liquid having a density which is at least as great as, or slightly greater than, the ice crystals produced in the freeze-evaporator unit 18, the ice crystals may be more easily slurried in the carrier liquid and moved throughout the process with relatively little settling out or precipitation of the crystals.

Where the water itself is flashed to the vapor state to refrigerate the saline solution in the freeze-evaporator unit 18, and to form ice crystals therein, a relatively wide variety of carrier liquids can be successfully employed. Examples of such liquids are n-octane, n-nonane, n-decane, o-xylene, m-xylene, cumene, chloropentane, chloronaphthalenes, cycloheptane, triolein, dodecyne, cyclopentane, and various animal oils. Mixtures of these and other materials which possess the required carrier liquid properties can also be utilized effectively.

Where an external secondary refrigerant liquid, such as liquid butane, is used, the choice of carrier liquids is narrowed considerably. In general, insoluble vegetable oils, such as, for example, castor oil and linseed oil, possess the requisite immiscibility in both water and the refrigerant liquid. It should be pointed out, however, that the examples of carrier liquids which are herein set forth do not constitute a comprehensive listing of all materials which can be employed in the process. Having detailed in this description of the invention, both the necessary and desirable properties and characteristics of the carrier liquid, it is believed that one possessing ordinary skill in the art will be able to evaluate and recognize suitable liquids by the exercise of routine experimentation.

The water vapor which is scrubbed in the scrubber unit 18 is drawn overhead by a suitable fan 24 and directed into the condenser 20. In entering the condenser 20, the water vapor is contacted by the carrier liquid which carries with it a quantity of ice crystals which have been washed and purified in a manner hereinafter described. The condenser 20 is preferably maintained at a temperature of about 0.5° C. and a pressure of about 6 mm. Hg. At this temperature and pressure, the water vapor, upon contacting the carrier liquid, is condensed and accumulates as fresh water in the bottom of the condenser. Also, the ice crystals entrained in the carrier liquid are melted and produce fresh water which gravitates to the bottom of the condenser. The carrier liquid, which is immiscible with water and is less dense than the water, stratifies on top of the water. The carrier liquid from the condenser 20 is then, as hereinbefore explained, delivered by a suitable pump 22 to the scrubber unit 18 where it functions to remove entrained brine and salt crystals from the water vapor.

Carrier liquid from the scrubber unit 18 is passed in part to a slurry chamber 26 via a suitable conduit or pipe 28. A portion of the carrier liquid with a small amount of brine mixed therewith may be recycled from the scrubber unit 18 by way of conduit 30 to the freeze-evaporator 16 to aid in the formation of ice crystals in the latter unit. The mixture of saline solution and ice crystals from the freeze-evaporator 16 is transferred through a conduit 32 to the slurry chamber 26 where it is directly and intimately contacted with the major portion or all of the carrier liquid from the scrubber unit 18. The carrier liquid, in contacting the ice crystals entrained in the saline solution, partially scrubs these crystals and removes a portion of the occluded brine therefrom.

From the slurry chamber 26, a part of the slurry mixture of ice crystals, saline solution and carrier liquid may be recycled through conduit 34 to the freeze-evaporator 16 where the ice crystals function as nucleation sites in furthering or in enhancing the freezing out of ice crystals from the incoming percooled sea water. The major portion of the effluent from the slurry chamber 26 is directed by a suitable conduit 36 to a settling tank 38 where the mixture is permitted to stand relatively quiescently so that the heavier brine gravitates to the bottom of the tank, and the mixture of carrier liquid and ice crystals moves to the upper portion of the tank. The brine is then removed from the bottom of the settling tank 38 by a suitable pump 40 and conduit 42 and directed through the heat exchanger 14 where, by indirect heat exchange, it functions to lower the temperature of the sea water being introduced to the process.

The mixture of carrier liquid and ice crystals from the upper portion of the settling tank 38 is pumped by a suitable pump 44 through a conduit 46 into a washed tank 48. As the mixture of carrier liquid and ice crystals from the settling tank 38 enters the wash tank 48, it joins a stream of fresh water entering the wash tank 48 from conduit 50 and ultimately derived from the condenser 20. In the wash tank 48, the fresh water gravitates to the bottom of the tank as a result of its greater density than the carrier liquid. In the course of this movement, it scrubs the ice crystals entrained in the carrier liquid and removes occluded brine therefrom. It should also be pointed out that the pump 44 functions to increase the pressure in the wash tank 48 to within a range of from about 50 to about 100 p.s.i.g. so that, as a result of the increased pressure, a very slight melting of the ice crystals occurs at the surface of the crystals. This slight melting effect, coupled with the scrubbing action of the small amount of fresh water introduced to the wash tank 48, effectively removes occluded brine from the ice crystals. This brine moves to the bottom of the wash tank with the wash water and can be withdrawn therefrom through a suitable conduit 52 and merged with the brine moving in the conduit 42.

The ice crystals and carrier liquid from the wash tank 48 are directed through a conduit 54 to the top of the condenser 20. This stream then functions, as hereinbefore described, to condense the water vapor entering the condenser 20 from the scrubber unit 18. Melting of the ice crystals entrained in the carrier liquid also occurs in the conduit 54 and the condenser 20 so that the net yield of fresh water which accumulates in the bottom of the condenser 20 results from the melting of the ice crystals in addition to the condensation of the water vapor. The fresh water from the condenser 20 is then passed by a pump 56, in major part, through a product line conduit 58 in indirect heat exchange relation to the incoming sea water in the heat exchanger 14. A small amount of the fresh water determined by the setting of the valve 60 is directed through the conduit 50 to the wash tank 48. It will be noted that the use of the fresh water for washing the ice crystals is optional as permitted by the inclusion of the valve 60 in the system. In some instances, it will not be necessary or desirable to use any of the fresh water for washing the ice crystals, since the level of salinity which can be tolerated in the fresh water product considering the use to be made of it will be such that maximum purity of the fresh water is not required.

In FIGURE 2 of the drawings, a modified embodiment of the process of the present invention is illustrated, in which embodiment a secondary or external refrigerant is utilized for freezing ice crystals from the precooled sea water, rather than producing the ice crystals by the flash evaporation of the water itself. As illustrated in FIGURE 2, the conventionally pre-treated sea water is inducted into the process through a suitable conduit or pipeline 70, and is passed through an indirect heat exchange unit 72 where it is pre-cooled by indirect heat exchange with the cold brine and fresh water streams produced in the process as hereinafter described. The pre-cooled sea water is then directed into a freeze-evaporator unit 74 where it is directly and intimately mixed with a low boiling liquid refrigerant material, such as liquid butane. The liquid butane is directed to the freeze-evaporator unit 74 from a conduit 76 which interconnects the freeze-evaporator unit with a condenser 78 hereinafter more fully described. The pressure maintained within the freeze-evaporator unit 74 is sufficiently low that the liquid refrigerant utilized is flashed to the vapor state; thus reducing the temperature in the unit and causing ice crystals to freeze from the sea water. Where liquid butane is used as the secondary refrigerant, a pressure in the range of from about 650 mm. Hg to about 725 mm. Hg is utilized to flash the liquid butane to the vapor state, and to lower the temperature in the freeze-evaporator unit 74 to from about −2° C. to about −4° C.

The butane vapors from the freeze-evaporator unit 74 are drawn overhead by a suitable compressor 80 and are directed into the condenser 78. A pressure of about 800 mm. Hg and a temperature of about 0.5° C. are maintained in the condenser 78, and in this unit, the butane vapors are condensed by contact with a carrier liquid. The carrier liquid entering the condenser 78 also contains a substantial quantity of entrained ice crystals which are melted in the condenser.

As previously explained, the carrier liquid which is selected for use in the process of the invention is substantially immiscible in the refrigerant, whether the refrigerant utilized be the water from saline solution itself, or a secondary refrigerant such as the liquid butane. The carrier liquid is also of substantially different density than the refrigerant material in use, so that three liquid phases are formed in the condenser 78 in the manner illustrated in FIGURE 2.

It should be pointed out that, though the carrier liquid should be substantially immiscible in the secondary refrigerant in use, mutual immiscibility of these liquids is not required, and the refrigerant liquid can be soluble to some extent in the carrier liquid. In other words, it is undesirable for any significant amount of the carrier liquid (say, in excess of 10 and preferably 5 weight percent) to be dissolved in the refrigerant material, since such solution will decrease the effectiveness of the refrigerant material in performing its primary function of flash evaporation freezing of ice crystals from the pre-cooled sea water in the freeze-evaporator unit 74.

From the condenser 78, the liquid butane is withdrawn from its respective level in the condenser, and is directed by a suitable pump 82 through the conduit 76 to the freeze-evaporator unit 74 where it is again flashed to the vapor state to freeze ice crystals from the incoming sea water. The carrier liquid which accumulates in the condenser 78 as a separate and distinct phase is withdrawn from the condenser and passed through a conduit 84 to a slurry chamber 86. In the slurry chamber 86, the carrier liquid is directly and intimately contacted with cold sea water and ice crystals from the freeze-evaporator unit 74. Here the partial scrubbing of the ice crystals by contact with the carrier liquid occurs, as has previously been described. From the slurry chamber 86, a portion of the mixture of sea water, ice crystals and carrier liquid may be recycled to the freeze-evaporator unit 74 to promote development of the ice crystals therein. The major portion of the mixture, however, is directed to the separation tower 38 where separation of the brine from the slurry of ice crystals suspended in the carrier liquid is permitted to occur as a result of the difference in density between the brine and the slurry. The ice crystals are entrained in the carrier liquid and, in this manner, are separated from the brine which stratifies in the bottom of the separation tower 38. The remaining steps of the process, as it is practiced using a secondary refrigerant material, such as liquid butane, are carried out in substantially the same manner as has been described in referring to the embodiment of the process depicted in FIGURE 1. Thus, identical reference numerals have been used to identify the pump 44, conduit 46, wash tank 48, conduit 54, pump 56, and conduit 58.

From the foregoing description of the invention, it will be perceived that the proposed process provides a substantial economic improvement over those systems in which either the refrigerant liquid itself is utilized to separate ice crystals from the residual brine, or in which the washing of the ice crystals is accomplished by complicated ancillary equipment. The carrier liquid employed, by reason of its immiscibility in the other fluids used in the process, and by reason of its relatively non-volatile character, can be maintained intact over long periods of time, and is continuously recirculated in the closed system which is utilized. The ice crystals which are produced prior to the final melting thereof are thoroughly cleansed of occluded brine so that a high level of purity is obtained in the final fresh water product yielded by the process.

Although certain specific embodiments of the process of the invention have been herein described in order to provide examples which will enable those skilled in the art to realize its advantages, it is to be noted that various modifications and changes may be made in the exemplary process conditions and parameters herein described without departure from the basic principles which underlie the invention. For example, the indirect heat exchanger 14 in FIGURE 1 and 72 in FIGURE 2 could be replaced by a direct contact heat exchanger. Likewise, separation towers 38 and 48 in FIGURE 1 and, 38 and 48 in FIGURE 2 could be replaced by cyclones or centrifugal separators. Insofar as these changes and innovations continue to rely upon such basic principles, they are deemed to be circumscribed by the spirit and scope of the present invention except as the same may be necessarily limited by the appended claims or reasonable equivalents thereof.

We claim:
1. In a process for recovering fresh water from a saline solution and which encompasses the step of freezing ice crystals from the saline solution by reducing the pressure on the solution to flash therefrom the vapors of a refrigerant selected from the class consisting of water and an organic material substantially immiscible with water, the improvement which comprises:
  mixing with a carrier liquid, the saline solution and ice crystals remaining after flashing, said carrier liquid having the following properties:
    substantial mutual immiscibility with the saline solution and water;
    a freezing point below the freezing point of the saline solution;
    a density less than that of the saline solution and of water;
    substantial immiscibility in the refrigerant used in freezing ice crystals from the saline solution by flashing the refrigerant to the vapor state;
  separating a substantial portion of the ice and carrier liquid from the saline solution using said density difference to effect said separation, and slurrying the ice crystals in the carrier liquid separated from the saline solution;
  removing occluded saline solution from the ice crystals;
  separating a substantial portion of the removed occluded saline solution from the ice crystals and carrier liquid;
  melting the ice crystals to produce substantially pure water; and
  separating a substantial portion of the substantially pure water from the carrier liquid using the density difference between the pure water and the carrier liquid to effect said separation.

2. The process defined in claim 1 wherein occluded saline solution is at least partially removed from the ice crystals after the ice crystals and carrier liquid have been separated from the saline solution by increasing the pressure on the ice crystals and carrier liquid to at least about 50 p.s.i.g. to cause partial melting of the ice crystals to occur at the surface thereof.

3. The process defined in claim 1 wherein occluded brine is removed from the ice crystals by recycling a portion of the substantially pure product water and mixing said recycled portion with said carrier liquid and ice crystals after the non-occluded saline solution has been separated therefrom.

4. The process defined in claim 1 wherein, prior to separating the substantially pure water from the carrier liquid, the carrier liquid is contacted with said refrigerant vapors to condense the refrigerant vapors.

5. The process defined in claim 1 wherein said carrier liquid remains a liquid at temperatures as high as about 75° C.

6. The process as defined in claim 1 wherein said carrier liquid has a density between the density of the saline solution and the effective density of the ice crystals.

7. The process defined in claim 1 and further characterized to include the step of scrubbing the refrigerant vapors prior to their condensation to remove entrained brine therefrom.

8. The method of recovering fresh water from saline water which comprises:
  pre-cooling the saline water to a temperature of from about 20° C. to about 0° C. above its freezing point;
  reducing the pressure of the pre-cooled saline water to about 3 to 4 mm. Hg to flash a portion of the water to the vapor state and convert a portion of the water to ice crystals;
  directly and intimately mixing with a carrier liquid, the saline water and ice crystals formed upon flashing, said carrier liquid having the following properties:
    substantial mutual immiscibility with water;
    a density lower than the density of fresh water and the saline water; and
    a freezing point lower than the freezing point of the saline water;
  separating a substantial portion of the saline water from the carrier liquid and ice crystals entrained therein, using said density difference to effect said separation;
  removing occluded saline water from the ice crystals while the ice crystals are suspended in said carrier liquid;
  melting the ice crystals to produce fresh water mixed with carrier liquid; and then
  separating a substantial portion of the fresh water from the carrier liquid.

9. The method of recovering fresh water as defined in claim 8 and further characterized to include the steps of using said carrier liquid to condense water vapor derived from the flashing of said pre-cooled saline water by passing the carrier liquid into contact with said water vapor at a pressure and temperature to effect said condensation; then separating from the carrier liquid, the water derived from the condensation of the water vapor.

10. The process as defined in claim 8 wherein the fresh water and the saline water separated from the carrier liquid in the process are circulated in heat exchange relation to saline water entering the process to pre-cool the entering saline water.

11. The method defined in claim 8 wherein occluded saline water is removed from the ice crystals by increasing the pressure thereon and contacting the ice crystals with fresh water.

12. The method defined in claim 9 wherein prior to condensation of fresh water vapor, the water vapor is scrubbed to remove entrained saline solution therefrom by contacting the water vapor with carrier liquid at a temperature and pressure at which the water remains in the vapor state.

13. The method defined in claim 8 wherein said carrier liquid has a freezing point preferably at least as low as −15° C.

14. The method of recovering fresh water from saline water which comprises:
  pre-cooling the saline water to a temperature of from about 20° C. to about 0° C. above its freezing point;
  mixing the saline water with a volatile, organic refrigerant liquid;
  reducing the pressure on the mixture of pre-cooled saline water and refrigerant liquid to flash at least a portion of the refrigerant to the vapor state and cool the mixture sufficiently to freeze ice crystals from the saline water;
  directly and intimately mixing with a carrier liquid, the saline water and ice crystals formed upon flashing, said carrier liquid having the following properties:
    mutual immiscibility with water;
    a density lower than the density of fresh water and the saline water, and different from the density of the refrigerant liquid;
    immiscibility in the refrigerant liquid; and
    a freezing point lower than the freezing point of the saline water;
  separating a substantial portion of the saline water from the carrier liquid and ice crystals entrained therein, using the density difference between the carrier liquid and saline water to effect said separation;
  removing occluded saline water from the ice crystals while the ice crystals are suspended in said carrier liquid;
  melting the ice crystals to produce fresh water mixed with carrier liquid; and then
  separating the fresh water from the carrier liquid.

15. The method defined in claim 14 wherein the refrigerant liquid is n-butane.

16. The method defined in claim 14 wherein said carrier liquid is a vegetable oil.

17. The method defined in claim 14 and further characterized to include the step of contacting the refrigerant vapors produced upon flashing with said carrier liquid prior to separating fresh water from the carrier liquid in the last step of the process set forth in claim 14 whereby said refrigerant vapors are condensed; then
  recycling the condensed refrigerant liquid into admixture with the pre-cooled saline water entering the process.

18. The method defined in claim 14 wherein occluded saline water is removed from the ice crystals by contacting the crystals with fresh water produced in the process.

19. The method defined in claim 14 wherein said carrier liquid is further characterized in having a density at least as great as the effective density of the ice crystals formed in the process.

References Cited

UNITED STATES PATENTS

| | | | |
|---|---|---|---|
| 2,904,511 | 9/1959 | Donath | 210—67 X |
| 3,119,772 | 1/1964 | Hess et al. | 210—205 X |
| 3,214,371 | 10/1965 | Tuwiner | 210—60 |
| 3,339,372 | 9/1967 | Cottle | 62—58 |

OTHER REFERENCES

Barduhn, Allen J.: The Freezing Process For Water Conversion. In First International Symposium on Water Desolination, Bulletin SWD/88, U.S. Dept. of the Interior, Oct. 3–9, 1965.

REUBEN FRIEDMAN, *Primary Examiner.*

J. ADEE, *Assistant Examiner.*